US010576591B2

(12) United States Patent
Ge

(10) Patent No.: US 10,576,591 B2
(45) Date of Patent: Mar. 3, 2020

(54) JIG FOR SUPPORTING DISPLAY SCREEN

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventor: Feiluan Ge, Beijing (CN)

(73) Assignees: BOE TECHNOLOGY GROUP CO., LTD., Beijing (CN); K-TRONICS (SUZHOU) TECHNOLOGY CO., LTD., Jiangsu (CN)

( * ) Notice: Subject to any disclaimer, the term of this patent is extended or adjusted under 35 U.S.C. 154(b) by 226 days.

(21) Appl. No.: 15/792,920

(22) Filed: Oct. 25, 2017

(65) Prior Publication Data
US 2018/0264607 A1    Sep. 20, 2018

(30) Foreign Application Priority Data

Mar. 14, 2017  (CN) ............... 2017 2 0245030 U

(51) Int. Cl.
*B23Q 1/03*    (2006.01)
*G06F 1/16*    (2006.01)
*B23Q 3/18*    (2006.01)
*B23Q 1/36*    (2006.01)
*G02F 1/13*    (2006.01)

(52) U.S. Cl.
CPC ........... *B23Q 1/032* (2013.01); *G06F 1/1601* (2013.01); *B23Q 1/36* (2013.01); *B23Q 3/18* (2013.01); *G02F 1/1303* (2013.01)

(58) Field of Classification Search
CPC .. B23Q 1/03; B23Q 1/032; B23Q 1/36; B25B 11/02; G02F 1/1303; G02F 1/13; G02F 1/1306; G02F 1/1309; G01N 2021/9513; G09G 3/006; Y10T 29/53991
See application file for complete search history.

(56) References Cited

U.S. PATENT DOCUMENTS

| | | | | | |
|---|---|---|---|---|---|
| 2,905,064 | A | * | 9/1959 | Nielsen | B23P 25/00 269/7 |
| 3,568,289 | A | * | 3/1971 | Jenkins, Sr. et al. | D01G 15/34 29/897.15 |
| 3,570,351 | A | * | 3/1971 | Spengler | B23D 49/007 83/425 |
| 3,624,819 | A | * | 11/1971 | Schickling | B23Q 1/032 408/92 |
| 3,908,975 | A | * | 9/1975 | Bryant | B25B 11/02 269/40 |
| D256,751 | S | * | 9/1980 | Crawford | D11/149 |

(Continued)

*Primary Examiner* — Tyrone V Hall, Jr.
(74) *Attorney, Agent, or Firm* — Calfee, Halter & Griswold LLP

(57) ABSTRACT

A jig for supporting a display screen including a platform, a stop and a support is provided. The stop is located on the platform. The support is located at one side of the platform and includes an arcuate surface for supporting the display screen, wherein the display screen is placed on the stop before turning over and is supported by the arcuate surface after turning over. The jig adopts the arcuate surface to contact a surface of a supported object. When turning the supported object over, contact area between the supported object and the arcuate surface can be constantly changed, so that a force exerted on the supported object is even so as to avoid a cracking of the supported object.

13 Claims, 6 Drawing Sheets

(56) References Cited

U.S. PATENT DOCUMENTS

| | | | | |
|---|---|---|---|---|
| 4,290,237 | A * | 9/1981 | Jameikis | B23Q 1/525 409/164 |
| 4,368,842 | A * | 1/1983 | DeLange, III | A47G 29/1209 232/17 |
| 4,579,271 | A * | 4/1986 | Fujita | B23K 37/04 228/46 |
| 5,647,706 | A * | 7/1997 | Lehmler | B23Q 1/032 409/138 |
| 5,984,172 | A * | 11/1999 | Easterwood | A47G 29/1209 150/154 |
| 6,296,180 | B1 * | 10/2001 | Blizzard | A47G 29/1209 232/38 |
| 6,308,884 | B1 * | 10/2001 | Hamburger | A47G 29/1209 232/38 |
| 6,486,927 | B1 * | 11/2002 | Kim | G02F 1/1309 349/1 |
| 6,879,180 | B2 * | 4/2005 | Iwata | G01N 21/88 324/750.22 |
| 6,972,586 | B2 * | 12/2005 | Sawamori | H01J 9/42 324/750.16 |
| 7,230,416 | B2 * | 6/2007 | Huang | G09G 3/006 324/756.05 |
| 7,471,470 | B2 * | 12/2008 | Kuroda | G02B 7/02 359/811 |
| 7,889,311 | B2 * | 2/2011 | Lee | G02F 1/1303 324/760.01 |
| 8,816,714 | B2 * | 8/2014 | Kwon | G02F 1/1309 324/756.01 |
| 9,498,940 | B2 * | 11/2016 | Oh | B32B 37/10 |
| 9,958,475 | B2 * | 5/2018 | Wang | G01R 1/0408 |
| 10,212,865 | B2 * | 2/2019 | Son | G02F 1/1303 |
| 2005/0218204 | A1 * | 10/2005 | Menghini | A47G 29/1209 232/38 |
| 2013/0019446 | A1 * | 1/2013 | Venskus | B23Q 1/012 29/407.09 |
| 2014/0002975 | A1 * | 1/2014 | Lee | H05K 5/0017 361/679.01 |
| 2014/0299269 | A1 * | 10/2014 | Son | B32B 37/10 156/295 |
| 2019/0023417 | A1 * | 1/2019 | Hirai | B64C 1/12 |

\* cited by examiner

JIG FOR SUPPORTING DISPLAY SCREEN

RELATED APPLICATION

This application claims the benefit of the priority of the Chinese patent application No. 201720245030.8 filed on Mar. 14, 2017, which is incorporated herein by reference in its entirety, the entire content of which is incorporated herein by reference.

FIELD OF THE DISCLOSURE

The present disclosure relates to a field of a jig, and in particular to a support jig, and more particularly to a jig for supporting a display screen.

BACKGROUND OF THE DISCLOSURE

At present, when the appearance of a display screen is inspected, the display screen is placed on a jig for appearance inspection and the display screen needs to be turned over in order to inspect a rear shell of the display screen.

However, the jig for inspecting the appearance of the display screen in prior art usually has sharp edges and corners, which not only cause an excessive local stress on the display screen, easily leading to a bending deformation and a brittle fracture of the display screen, but also is unfavorable to the turning over of the screen when inspecting the rear face of the display screen.

SUMMARY OF THE DISCLOSURE

The present disclosure provides a jig for supporting a display screen, comprising a platform, a stop and a support, the stop being located on the platform, the support being located at one side of the platform and including an arcuate surface for supporting the display screen, wherein the display screen is placed on the stop before turning over and is supported by the arcuate surface after turning over.

According to an aspect of the present disclosure, a bottom surface of the stop is rectangular and an edge of the stop in contact with the platform and adjacent to the support is parallel to a generating line of the arcuate surface.

According to an aspect of the present disclosure, the arcuate surface is covered with a protective layer.

According to an aspect of the present disclosure, the protective layer is a silica gel layer.

According to an aspect of the present disclosure, the support comprises an arcuate plate, an arcuate convex surface of the arcuate plate is the arcuate surface; the support further includes a bracket located under the arcuate plate for supporting the arcuate plate.

According to an aspect of the present disclosure, an elastic member is provided between the bracket and the arcuate plate.

According to an aspect of the present disclosure, cross-sectional shapes of two ends of the arcuate surface are the same.

According to an aspect of the present disclosure, a radius of curvature of the arcuate surface is no less than 30 mm.

According to an aspect of the present disclosure, the arcuate surface has a rectangular orthographic projection on a horizontal plane, and a long side dimension of the rectangle is larger than a long side dimension of the display screen.

According to an aspect of the present disclosure, the support is higher than the stop so that when the display screen is turning over towards a side of the stop away from the platform, it can be placed on the support.

According to an aspect of the present disclosure, a height difference between the support and the stop is no less than 50 mm.

DETAILED DESCRIPTION OF THE DISCLOSURE

In order to provide better understanding of the technical solution of the present disclosure as to those skilled in the art, a jig provided by the present disclosure will now be described in detail with reference to the accompanying drawings.

The present disclosure will now be described in detail by taking a supported object as a display screen as an example. It also should be understood that the jig of the present disclosure is not limited to be used with the display screen and is also suitable for supporting other brittle products.

Figure 1A:
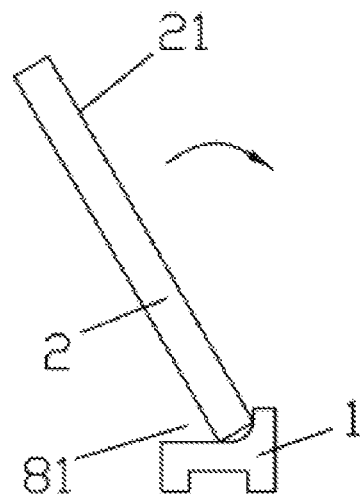
FIG. 1A is a schematic structural view of a jig for appearance inspection according to an example of the present disclosure.
Figure 1B:
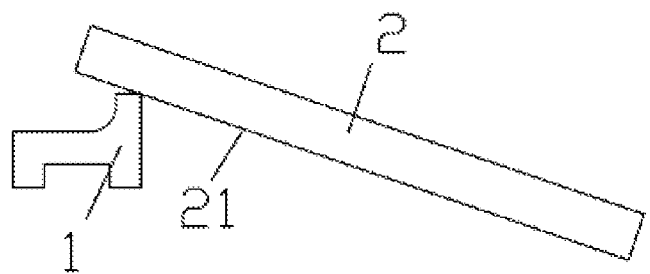
FIG. 1B is a schematic structural view of the jig for appearance inspection in FIG. 1A when a display screen is turned over.

Referring now to FIG. 1A and 1B, FIG. A and 1B show a schematic structural view of a jig for inspecting the appearance of a display screen according to an embodiment of the present disclosure and a schematic structural view of the jig for appearance inspection after the display screen is turned over, respectively. As shown in FIGS. 1A and 1B, the jig for appearance inspection includes a front stop 1 for supporting the display screen 2 and allowing it to be placed obliquely. When a rear shell of the display screen 2 needs to be inspected, the display screen 2 on the front stop 1 should be turned over in the turning direction as shown by the arrow in FIG. 1A. After turning over, as shown in FIG. 1B, a front face 21 of the display screen 2 comes into contact with one of the edges of an upper end face of the front stop 1. There is a problem that the area where the display screen 2 is in contact with the front stop 1 is subject to a relatively larger force and the screen is prone to crack.

On the basis of foregoing, the inventors of the present disclosure have made further improvements and perfections to the jig for appearance inspection in FIG. 1A and 1B.

Referring to FIGS. 2A to 4, the jig comprises a platform 10 and a support 3, wherein the platform 10 is provided at one side of an assembly line 9 for transporting supported objects and is fixed relative to the assembly line 9. The above-described assembly line 9 can be, for example, an assembling line for assembling the supported objects. In the production process, workers can remove a supported object from the assembly line 9 and place it on the platform 10 for operations such as appearance inspection. The supported object can be, for example, a display screen.

Figure 3A:
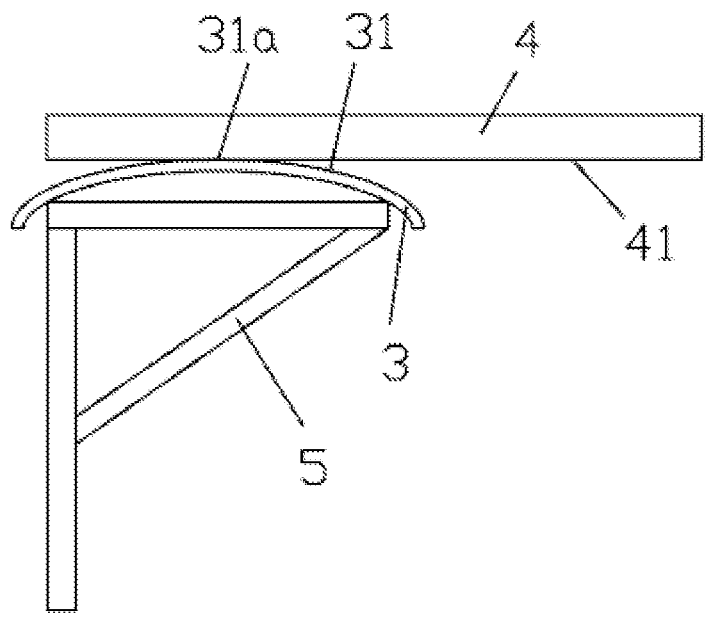
FIG. 3A is a schematic structural view of a support according to an embodiment of the present disclosure.
Figure 3B:
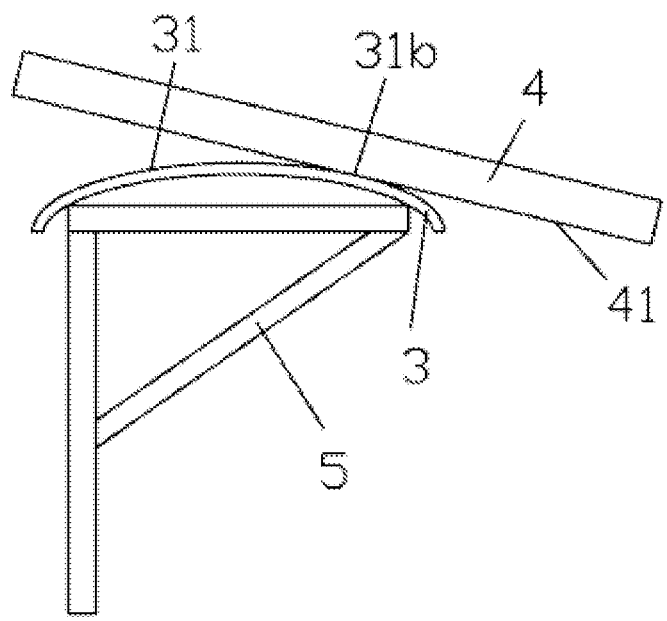
FIG. 3B is a schematic view of the support in FIG. 3A after a contact area between the support and the arcuate surface is changed.

The support 3 is provided at one side of the platform 10, and the supported object 3 includes an arcuate surface 31. The arcuate surface 31 is used to contact a surface 41 of the supported object 4. In the present embodiment, the support 3 includes an arcuate plate whose arcuate convex surface is the arcuate surface 31. Further, the support 3 further comprises a bracket 5 for supporting the arcuate plate. Because the surface 41 of the supported object 4 is in contact with the arcuate surface 31, a contact area (generally a surface contact area) between the supported object 4 and the arcuate surface 31 can be constantly changed when operations such as the appearance inspection of the supported object 4 are performed. For example, as shown in FIG. 3A, the contact area between the supported object 4 and the arcuate surface 31 is at a position 31a. However, after the orientation of the supported object is changed by a certain angle, the contact area between the supported object 4 and the arcuate surfaces 31 is changed to the position 31b shown in FIG. 3B so that a force exerted on the supported object can be even, thereby preventing the supported object from being deformed or broken.

According to an aspect of the present disclosure, a radius of curvature of the arcuate surface is no less than 30 mm, and the range of the radius of curvature can ensure that the force exerted on the supported object is even. Of course, in practical applications, the radius of curvature of the arcuate surface can be selected according to the particular conditions, so long as it is possible to achieve the purpose that the force exerted on the supported object is even.

Figure 4:
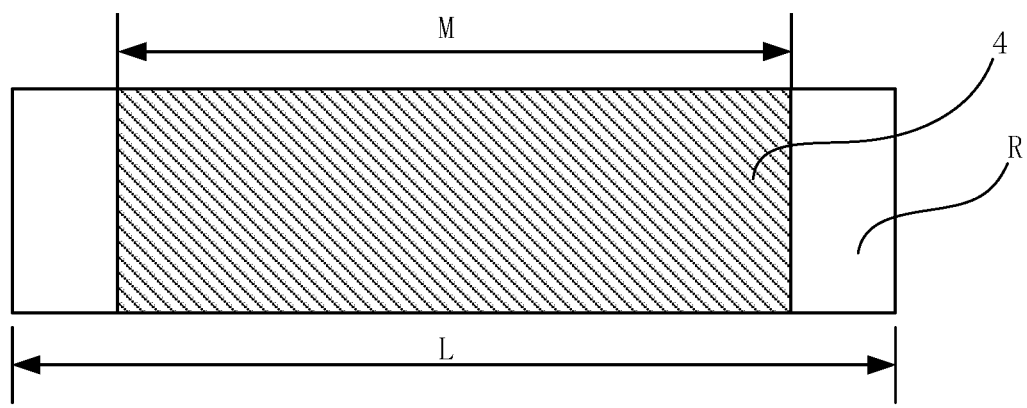
FIG. 4 is a top view of an arcuate surface according to an embodiment of the present disclosure.

As shown in FIG. 4, the arcuate surface 31 has a rectangular orthographic projection on a horizontal plane. The horizontal plane can be, for example, the ground or other parallel-arranged surface. A long side dimension L of the rectangle R is larger than a long side dimension M of the supported object 4 so as to ensure that the portion of the supported object 4 along the long side direction of the arcuate surface 31 can be fully supported by the arcuate surface 31 without being suspended so that the force exerted on the supported object 4 is even.

According to one aspect of the present disclosure, the sectional (cross-sectional) shapes of both ends of the arcuate surface 31 are the same so that the force exerted on the supported object 4 is even. Specifically, the cross-sectional shapes of both ends of the arcuate surface 31 refer to the projected shapes of the both ends of the arcuate surface 31 on a cross section plane perpendicular to the generating line of the arcuate surface 31, that is, the shapes of two ends of the arcuate surface 31 shown in the direction of the view of FIG. 3A.

In practical applications, as to the supported object such as a display screen, the long side dimension of the rectangle can be greater than or equal to 1400 mm, which is greater than or equal to the maximum dimension of the usual display screen, so that the support 3 can be used to support vast majority of display screens. Of course, in practical applications, the contour shape of the arcuate surface may also be of any other shape such as an oval, depending on the dimensions and shape of the different supported objects in practice.

Figure 5:
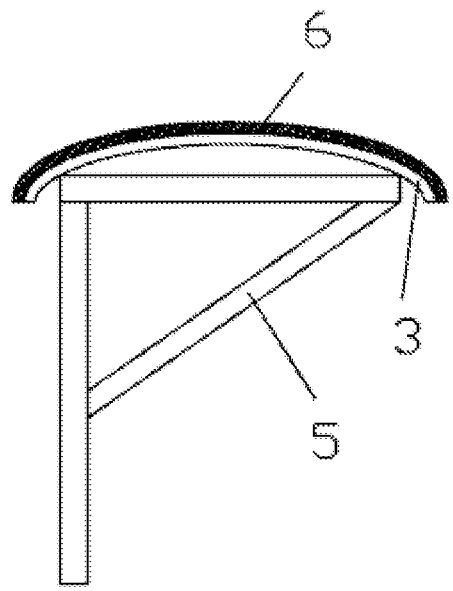
FIG. 5 is a schematic structural view of a further support according to an embodiment of the present disclosure.

According to an aspect of the present disclosure, as shown in FIG. 5, the arcuate surface 31 is covered with a protective layer 6 for reducing the hardness of the support 3 so as to protect the supported object from being scratched or abraded. The protective layer 6 can be a silica gel layer having a certain degree of elasticity so that the supported object 4 placed thereon can be further protected to reduce the risk of cracking. Of course, in practical applications, the protective layer 6 may not be provided, and the support 3 can be directly provided as a silica gel member.

Figure 7:
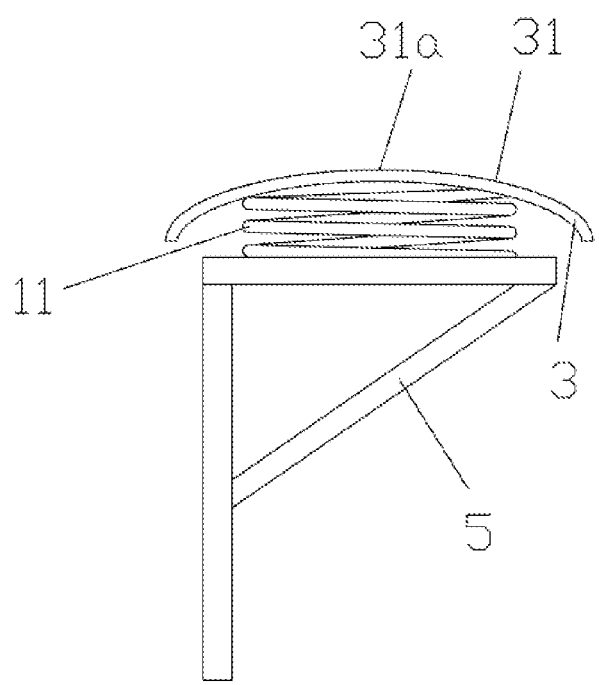
FIG. 7 is a schematic structural view of yet another support according to an embodiment of the present disclosure.

Further, according to an aspect of the present disclosure, as shown in FIG. 7, an elastic member 11 is provided between the bracket 5 and the arcuate plate and the elastic member 11 can have a cushion effect to the supported object when the supported object is placed on the arcuate surface 31 of the arcuate plate. The elastic member 11 can be, for example, a compression spring, and an upper and a lower ends thereof are fixedly connected to the arcuate plate and the bracket 5, respectively. The elastic member 11 is in its original state when the arcuate plate is at rest; when the supported object 4 is placed on the arcuate plate, the elastic member 11 is subjected to a compression deformation under the influence of the weight of the supported object 4. The number of the elastic member(s) 11 can be one or more, and a plurality of elastic members 11 can be spaced apart along the generating line direction of the arcuate surface 31 and/or can be spaced apart in a direction perpendicular to the generating line of the arcuate surface 31. In practical application, the type, dimension and quantity of the elastic members can be arbitrarily selected according to the specific situation.

Figure 6:
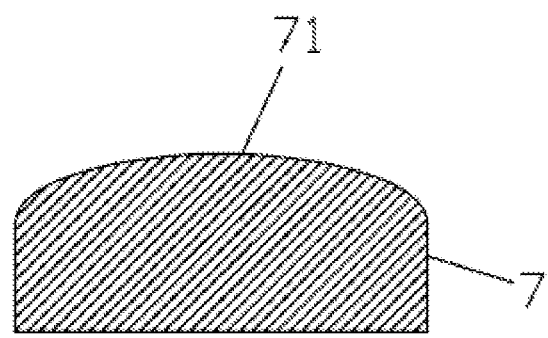
FIG. 6 is a schematic structural view of another support according to an embodiment of the present disclosure.

It is to be noted that in the present embodiment, the support member 3 is an arcuate plate, but the present disclosure is not limited thereto, and in practical applications, the support member 3 can be any other structure having an arcuate surface. For example, as shown in FIG. 6, the support 7 is solid, and the upper surface of the support 7 is an arcuate surface 71.

Figure 2A:
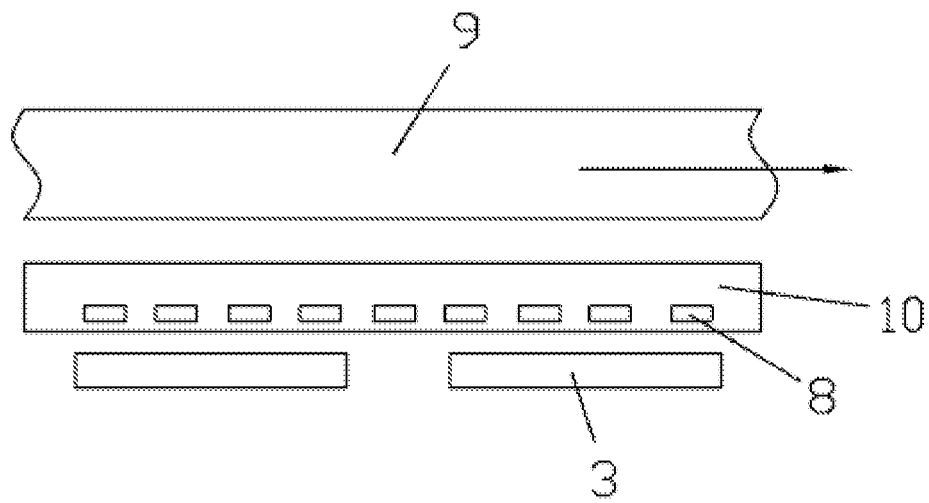
FIG. 2A is a schematic structural view of a jig provided by an embodiment of the present disclosure.

In the present embodiment, the stop 8 is provided on the platform 10, and the bottom surface of the stop 8 is rectangular (however, the bottom surface shape of the stop 8 is not limited thereto), and an edge (the lower edge of the stop 8 in FIG. 2A) of the stop 8 in contact with the platform 10 and adjacent to the support 3 is parallel to the generating line (the generating line is parallel to the upper edge of the support 3 in FIG. 2A) of the arcuate surface 31. In this way, it is convenient to turn the supported object 4 originally placed on the stop 8 to the support 3 for performing appearance inspection or the like. According to an aspect of the present disclosure, the stop 8 is provided with a recess 81 for supporting the supported object 4 and allowing it to be placed obliquely.

Figure 2B:
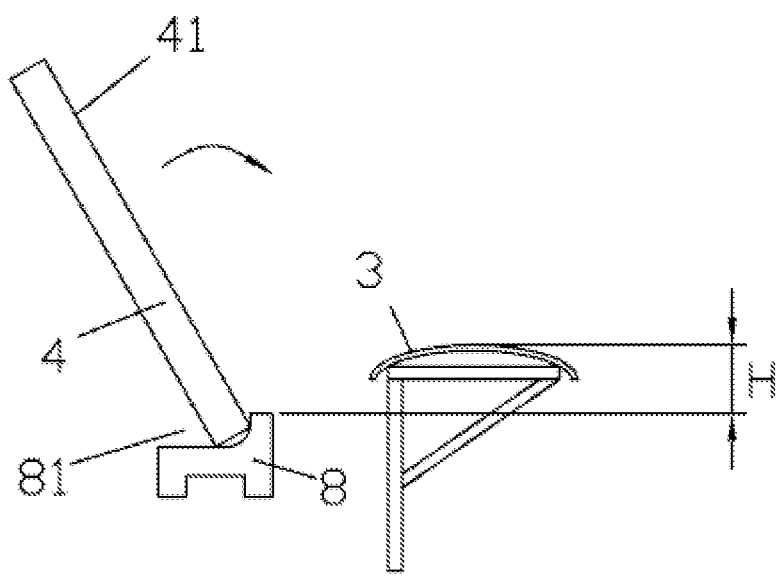
FIG. 2B is a schematic side view of a jig provided by an embodiment of the present disclosure.
Figure 2C:
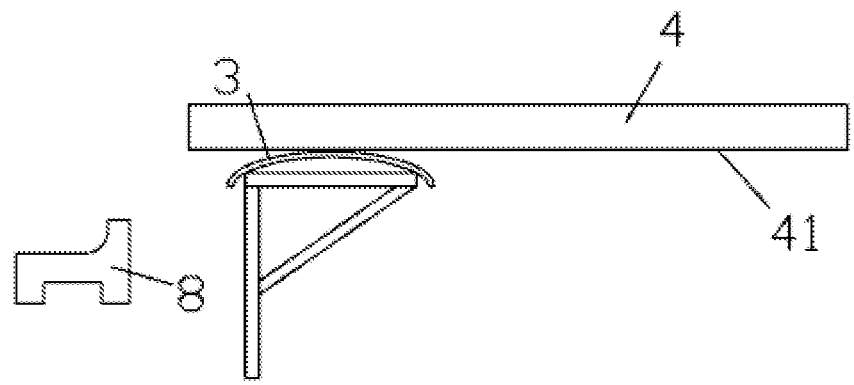
FIG. 2C is a schematic view of the jig in FIG. 2B after a supported object is turned over.

According to an aspect of the present disclosure, the support 3 is higher than the stop 8 so that when the supported object 4 is turned towards the support 3, that is, in the direction shown by the arrow in FIG. 2B, it can be placed on the support 3. After turning over, the supported object 4 will not contact the sharp edge of the upper end face of the stop 8. After turning over, as shown in FIG. 2C, the supported object 4 is separated from the stop 8 and is supported by the support 3. At this time, operations such as appearance inspection or the like can be performed on the supported object 4, preventing damage to the supported object 4.

According to an aspect of the present disclosure, the height difference H between the support 3 and the stop 8 is no less than 50 mm to ensure that after turning over, the supported object 4 can be supported by the support 3, and at the same time, not contact the stop 8.

The present disclosure has the following technical effects: in the jig for supporting a display screen provided by the present disclosure, the display screen can be supported by the arcuate surface after turning over. In this way, the display screen, which is originally placed on the stop, can be turned over to the support for performing appearance inspection or the like, wherein the arcuate surface of the support is in contact with the surface of the display screen so that, the contact area between the display screen and the arcuate surface can be constantly changed when performing inspection. On the other hand, the arcuate surface increases the force bearing area of the display screen so that the force exerted on the display screen is even and the exerted maximum force can be reduced, thereby avoiding the cracking of the display screen. In summary, the present disclosure provides a jig which can make the force exerted on the display screen even, so as to avoid cracking of the supported object.

Finally, it is to be understood that the phrase " a" or " an" does not exclude the plural in the claims of the disclosure, which is intended to be merely illustrative and should not be construed as limiting the scope of the disclosure.

The term "about" as used in this specification means within a deviation of +/−15% from the nominal value. It is to be understood that such variations are always included in any given value in this specification, whether or not explicitly stated.

Unless otherwise defined, all technical and scientific terms used in this specification have the same meaning as commonly understood by those skilled in the art to which this disclosure pertains.

It is to be understood that the above embodiments are merely exemplary embodiments for the purpose of illustrating the principles of the present disclosure, however, the present disclosure is not limited thereto. It will be apparent to those skilled in the art that various variations and modifications can be made therein without departing from the spirit and scope of the present disclosure, those variations and modifications are also to be regarded as within the scope of the present disclosure.

The invention claimed is:

1. A jig for supporting a display screen, comprising:
a platform;
a stop located on said platform;
a support located at one side of the platform and including an arcuate surface for supporting the display screen,
wherein the display screen is placed on the stop before turning over and is supported by the arcuate surface after turning over, and
wherein the arcuate surface is covered with a protective layer.

2. The jig according to claim 1, wherein a bottom surface of the stop is rectangular and an edge of the stop in contact with the platform and adjacent to the support is parallel to a generating line of the arcuate surface.

3. The jig according to claim 2, wherein the support comprises an arcuate plate, an arcuate convex surface of the arcuate plate is the arcuate surface;
the support further comprises a bracket located under the arcuate plate for supporting the arcuate plate.

4. The jig according to claim 1, wherein the protective layer is a silica gel layer.

5. The jig according to claim 4, wherein the support comprises an arcuate plate, an arcuate convex surface of the arcuate plate is the arcuate surface;
the support further comprises a bracket located under the arcuate plate for supporting the arcuate plate.

6. The jig according to claim 1, wherein the support comprises an arcuate plate, an arcuate convex surface of the arcuate plate is the arcuate surface;
the support further comprises a bracket located under the arcuate plate for supporting the arcuate plate.

7. The jig according to claim 6, wherein an elastic member is provided between the bracket and the arcuate plate.

8. The jig according to claim 1, wherein cross-sectional shapes of two ends of the arcuate surface are the same.

9. The jig according to claim 1, wherein a radius of curvature of the arcuate surface is no less than 30 mm.

10. The jig according to claim 1, wherein the arcuate surface has a rectangular orthographic projection on a horizontal plane, a long side dimension of the rectangle is larger than a long side dimension of the display screen.

11. The jig according to claim 1, wherein the support is higher than the stop.

12. The jig according to claim 11, wherein a height difference between the support and the stop is no less than 50 mm.

13. The jig according to claim 1, wherein the support comprises an arcuate plate, an arcuate convex surface of the arcuate plate is the arcuate surface;
the support further comprises a bracket located under the arcuate plate for supporting the arcuate plate.

* * * * *